(12) United States Patent
Bitto et al.

(10) Patent No.: US 12,523,587 B2
(45) Date of Patent: Jan. 13, 2026

(54) MODULAR MEASURING DEVICE FOR DETERMINING THE DENSITY OF A MEASUREMENT MEDIUM

(71) Applicant: Endress+Hauser Flowtec AG, Reinach (CH)

(72) Inventors: Ennio Bitto, Aesch (CH); Benjamin Schwenter, Ettingen (CH); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 331 days.

(21) Appl. No.: 18/548,943

(22) PCT Filed: Feb. 21, 2022

(86) PCT No.: PCT/EP2022/054246
§ 371 (c)(1),
(2) Date: Sep. 5, 2023

(87) PCT Pub. No.: WO2022/184486
PCT Pub. Date: Sep. 9, 2022

(65) Prior Publication Data
US 2024/0151621 A1    May 9, 2024

(30) Foreign Application Priority Data
Mar. 5, 2021    (DE) ...................... 10 2021 105 397.8

(51) Int. Cl.
*G01N 9/32*    (2006.01)
(52) U.S. Cl.
CPC ..................... *G01N 9/32* (2013.01)

(58) Field of Classification Search
CPC .... G01N 2009/006; G01N 9/002; G01N 9/32; G01F 1/8477; G01F 1/8422;
(Continued)

(56) References Cited

U.S. PATENT DOCUMENTS 10,209,113 B2 *    2/2019    Young ................... G01F 15/006

FOREIGN PATENT DOCUMENTS

AT    516421 B1    7/2016
DE    4026724 A1    3/1992
(Continued)

*Primary Examiner* — John E Breene
*Assistant Examiner* — Truong D Phan
(74) *Attorney, Agent, or Firm* — Christopher R. Powers; Endress+Hauser (USA) Holding, Inc.

(57) ABSTRACT

A modular measuring device for determining a density of a measurement medium includes a support module, a first measuring tube module and at least one further measuring tube module, wherein the support module has a receptacle for detachably fastening the measuring tube modules, a contactless temperature sensor, a primary exciter component along with a primary sensor component, wherein each measuring tube module has a restraint complementary to the receptacle of the support module, a vibrating tube, a secondary exciter component complementary to the primary exciter component, and a secondary sensor component complementary to the primary sensor component, wherein each vibrating tube of the measuring tube modules has a different tube diameter, a straight first tube leg, a straight second tube leg, a curved first tube bend and a curved second tube bend.

10 Claims, 5 Drawing Sheets

(58) Field of Classification Search
CPC .......... G01F 1/8431; G01F 1/849; G01F 1/74;
G01F 1/84; G01F 25/10; G01F 1/8495;
G01F 1/8409; G01F 1/8468; G01F
1/8472; G01F 1/8481; G01F 1/8486
USPC .............................. 73/32 A, 861.354, 504.02
See application file for complete search history.

(56) References Cited

FOREIGN PATENT DOCUMENTS

| | | | |
|---|---|---|---|
| DE | 202014004914 U1 | 7/2014 | |
| DE | 102019106244 A1 | 9/2020 | |
| DE | 102019134606 A1 | 6/2021 | |
| DE | 102019134806 A1 * | 6/2021 | ............. G01N 9/002 |
| JP | 2003121234 A | 4/2003 | |
| WO | 2011099989 A1 | 8/2011 | |
| WO | 2019048209 A2 | 3/2019 | |

* cited by examiner

MODULAR MEASURING DEVICE FOR DETERMINING THE DENSITY OF A MEASUREMENT MEDIUM

CROSS-REFERENCE TO RELATED APPLICATIONS

The present application is related to and claims the priority benefit of German Patent Application No. 10 2021 105 397.8, filed Mar. 5, 2021, and International Patent Application No. PCT/EP2022/054246, filed Feb. 21, 2022, the entire contents of which are incorporated herein by reference.

TECHNICAL FIELD

The invention relates to a modular measuring device for determining a density of a measurement medium.

BACKGROUND

Such measuring devices are also called Coriolis measuring devices. To measure the density of a measurement medium, it is passed through a vibrating tube of the measuring device, while the vibrating tube is vibrated by an exciter and the resulting vibration of the vibrating tube is measured. The resulting vibration depends on the density of the measurement medium flowing through the vibrating tube. By comparing the exciter vibration and the resulting vibration, the density of the measurement medium can finally be deduced. Such comparison uses, for example, a phase shift or a change in amplitude between the exciter vibration and the resulting vibration of the vibrating tube.

However, the resulting vibration is also dependent on the temperature of the vibrating tube, which affects, for example, a surface moment of inertia of the vibrating tube and thus the resulting vibration of the vibrating tube. Accurate temperature measurement of the vibrating tube is thus indispensable for being able to determine the density of the measurement medium with maximum accuracy.

In some industrial applications, measurement media that entail time-consuming and cost-intensive cleaning of the vibrating tube are used. For such applications it is desirable to use disposable vibrating tubes, which are exchangeably arranged in the Coriolis measuring device. However, an exchange of the vibrating tube also implies an exchange of the temperature sensor if it is non-detachably fixed to the vibrating tube.

Furthermore, depending on the industrial application, a predetermined diameter of the vibrating tube is necessary for realizing different flow rates. Depending on the desired flow rate, it is therefore necessary to use different vibrating tubes with different diameters.

SUMMARY

It is therefore an object of the invention to provide a modular measuring device that enables the use of vibrating tubes of different thicknesses and is at the same time cost-effective and precise.

This object is achieved by a modular measuring device according to the present disclosure.

The modular measuring device according to the invention for determining a density of a measurement medium, comprises: a support module, a first measuring tube module and at least one further measuring tube module. The support module has a receptacle for detachably fixing the measuring tube modules, a contactless temperature sensor, a primary exciter component and a primary sensor component. Each measuring tube module has a restraint that is complementary to the receptacle of the support module, a vibrating tube, a secondary exciter component that is complementary to the primary exciter component and a secondary sensing component that is complementary to the primary sensor component. Each vibrating tube of the measuring tube modules has a different tube diameter, a straight first tube leg, a straight second tube leg, a curved first tube bend and a curved second tube bend. The first tube legs are each connected to the first tube bends at a primary connection point. The first tube bends are connected to the second tube bends, and the second tube bends are each connected to the first tube legs at a secondary connection point. The primary connection point and the secondary connection point are located in a respective plane for each measuring tube module. The planes have a respective distance relative to one another, which corresponds to a difference between the respective tube diameters. The first tube bends and the second tube bends have an identical inner radius or an identical outer radius, such that the center lines associated with the respective vibrating tubes intersect at a first intersection point and at a second intersection point. The contactless temperature sensor is arranged such that when a measuring tube module is received in the support module, the contactless temperature sensor is directed at the first intersection point or the second intersection point.

Based on the modular measuring device according to the invention, it is possible to use different vibrating tubes with different tube diameters. This permits the use of a corresponding vibrating tube depending on the desired measurement accuracy. Furthermore, the contactless temperature sensor makes it possible to determine a vibrating tube temperature for each vibrating tube in a cost-effective, reliable and accurate manner. Due to the contactless temperature measurement, fewer parts of the modular measuring device are used only once, which lowers costs and is environmentally friendly. The specific shape of the different measuring tubes guarantees that the temperature sensor is always orthogonal to the surface to be measured of the different measuring tubes, which enables precise temperature measurement.

According to one embodiment of the invention, a tube section is arranged between the first tube bend and the second tube bend, which tube section connects the first tube bend and the second tube bend.

According to one embodiment of the invention, the tube section is straight.

According to one embodiment of the invention, the first tube leg and the second tube leg extend parallel relative to one another.

According to one embodiment of the invention, the secondary exciter component of the measuring tube module is arranged on the measuring tube module on a longitudinal axis. The vibrating tube is symmetrical with respect to the longitudinal axis.

According to one embodiment of the invention, the primary exciter component comprises a coil and the secondary exciter component comprises a permanent magnet, or the secondary exciter component comprises a coil and the primary exciter component comprises a permanent magnet.

According to one embodiment of the invention, the secondary sensor component is arranged on the first tube leg or on the second tube leg of the measuring tube module.

According to one embodiment of the invention, each measuring tube module has at least two identical vibrating tubes.

According to one embodiment of the invention, the measuring tube modules extend along a longitudinal axis, about which the vibrating tube is symmetrical. All measuring tube modules have the same extension length along the longitudinal axis.

According to one embodiment of the invention, the measuring tube modules extend along a longitudinal axis, about which the vibrating tube is symmetrical. All vibrating tubes intersect at a third intersection point on the longitudinal axis.

BRIEF DESCRIPTION OF THE DRAWINGS

The invention is explained in more detail on the basis of the following description of the figures. In the figures.

DETAILED DESCRIPTION

Figure 1:
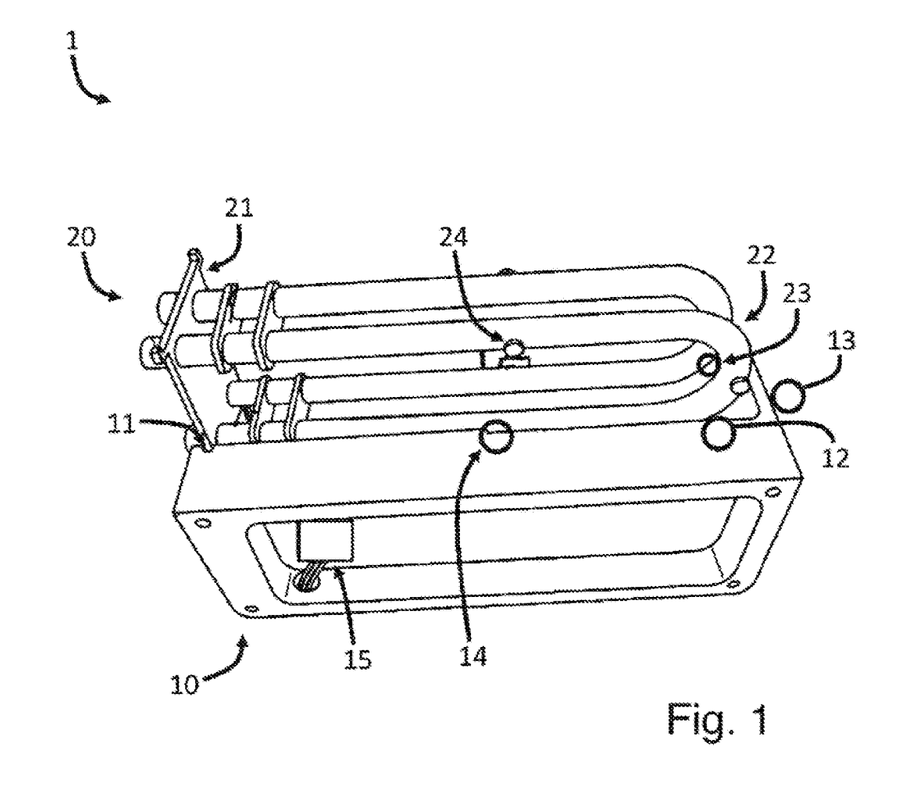
FIG. 1 shows an illustration of a modular measuring device according to the present disclosure.

FIG. 1 shows the modular measuring device 1 according to the invention for determining a density of a measurement medium. The modular measuring device 1 comprises a support module 10, a first measuring tube module 20 and at least one further measuring tube module 40, 60. For example, the modular measuring device 1 comprises three different measuring tube modules, specifically the first measuring tube module 20, a second measuring tube module 40 and a third measuring tube module 60 (see FIGS. 3 to 6). Of course, the modular measuring device 1 can also have more than three different measuring tube modules. The modular measuring device 1 preferably has a control unit 15, which is suitable for processing and evaluating the measured values determined by the modular measuring device 1.

The support module 10 of the modular measuring device 1 has a receptacle 11 for detachably fastening the measuring tube modules 20, 40, 60, a contactless temperature sensor 12, a primary exciter component 13 and a primary sensor component 14. The contactless temperature sensor 12, the primary exciter component 13 and the primary sensor component 14 are connected to the control unit 15 in order to be controlled by the control unit 15. The support module 10 is preferably made of a corrosion-resistant metal or a plastic. The receptacle 11 is, for example, a groove, as shown in FIG. 1, or a differently designed receptacle 11. The contactless temperature sensor 12 is, for example, an infrared sensor, a laser system for temperature measurement or another temperature sensor based on a contactless measurement method. The temperature sensor 12 is shown only schematically in FIG. 1. The primary exciter component 13 is, for example, a coil that is suitable for generating a magnetic field. The exciter component 13 is discussed in more detail later. The exciter component 11 is schematically shown in FIG. 1. The primary sensor component 14 is, for example, a coil that is suitable for detecting a magnetic field. The primary sensor component 14 is also discussed in more detail later. The primary sensor component 14 is also schematically shown in FIG. 1.

Figure 2:
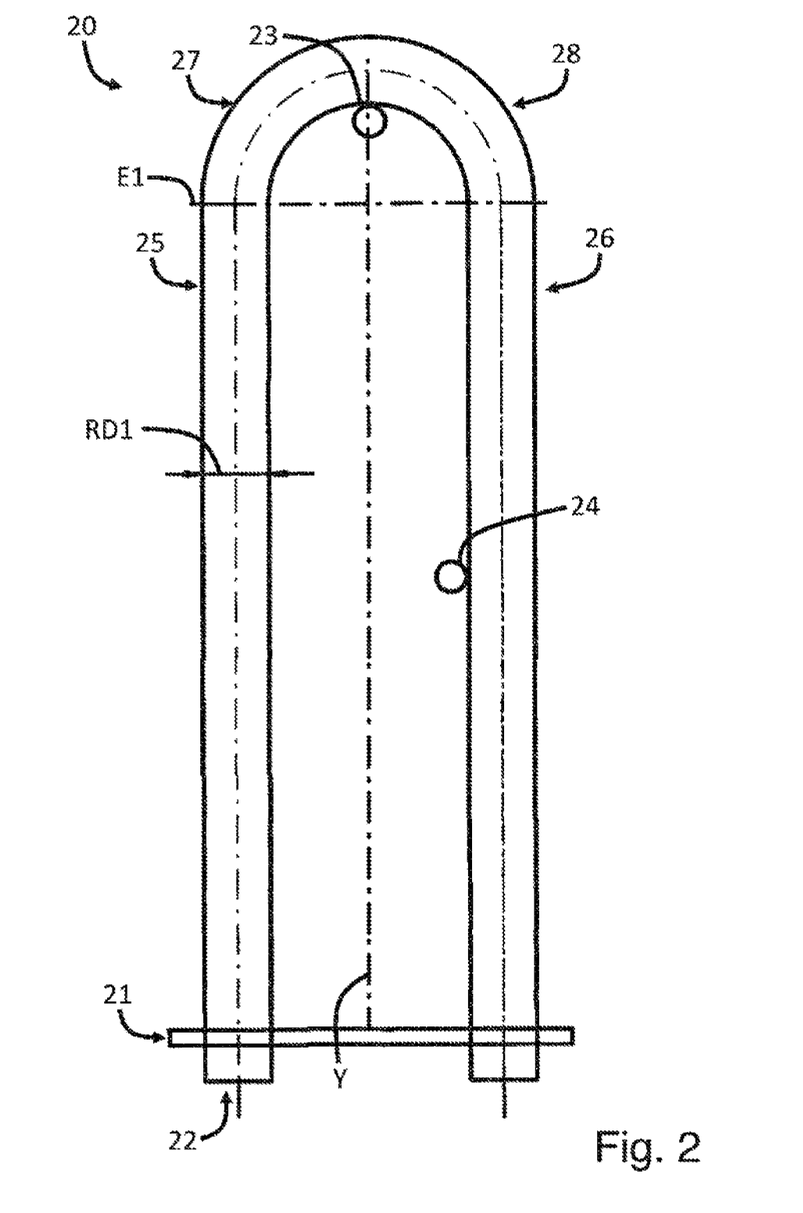
FIG. 2 shows a side view of a first embodiment of a measuring tube module.
Figure 3:
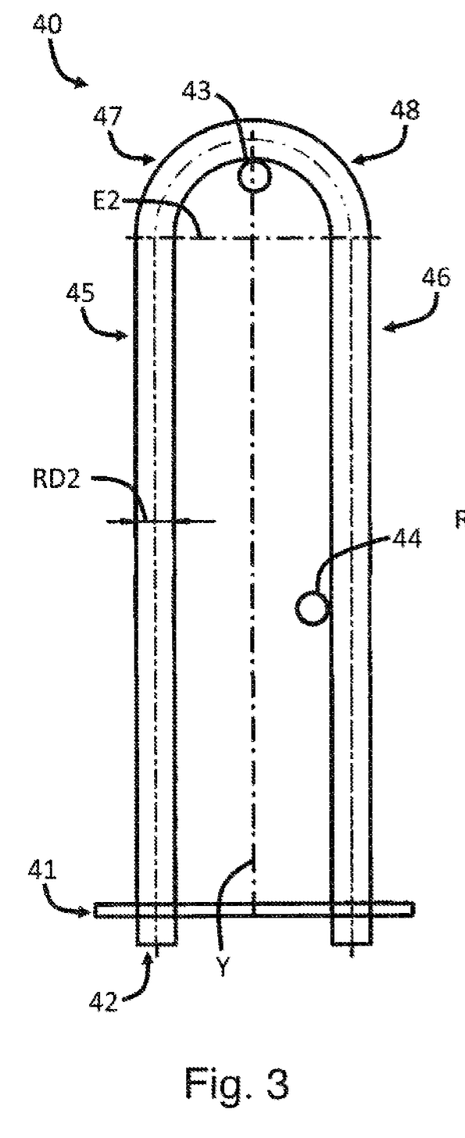
FIG. 3 shows a side view of a second embodiment of a measuring tube module.
Figure 4:
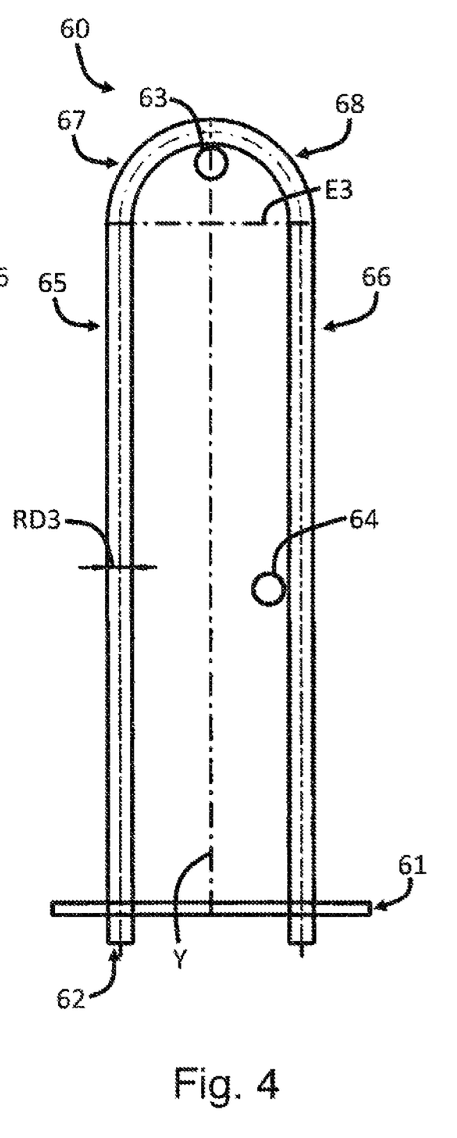
FIG. 4 shows a side view of a third embodiment of a measuring tube module.

As shown in FIGS. 2 to 4, each measuring tube module 20, 40, 60 of the modular measuring device 1 has a restraint 21, 41, 61 that is complementary to the restraint 11 of the support module 10, a vibrating tube 22, 42, 62, a secondary exciter component 23, 43, 63 that is complementary to the primary exciter component 13 and a secondary sensor component 24, 44, 64 that is complementary to the primary sensor component 14.

The restraint 21, 41, 61 is, for example, a plate-shaped element, with a thickness corresponding to the width of the groove, such that the restraint 21, 41, 61 can be inserted into the groove. The restraint 21, 41, 61 and/or the receptacle 11 preferably have a stop in order to arrange the measuring tube module 20, 40, 60 in a predetermined and reproducible position in the support module 10. Of course, other embodiments of the restraint are also possible, provided that these enable a positive and precise holding of the measuring tube modules 20, 40, 60 in the support module 10 of the modular measuring device 1.

The secondary exciter component 23, 43, 63 of the measuring tube module 20, 40, 60 is preferably arranged on the measuring tube module 20, 40, 60 on a longitudinal axis Y, wherein the vibrating tube 22, 42, 62 is symmetrical with respect to the longitudinal axis Y. Either the primary exciter component 13 comprises a coil and the secondary exciter component 23, 43, 63 comprises a permanent magnet, or the secondary exciter component 23, 43, 63 comprises a coil and the primary exciter component 13 comprises a permanent magnet. The secondary exciter component 23, 43, 63 is preferably arranged on an inner side of a tube leg 25, 26, 45, 46, 65, 66, i.e., a side facing the longitudinal axis Y. The secondary exciter component 23, 43, 63 is thus particularly well protected from damage.

The secondary sensor component 24, 44, 64 is preferably arranged on the first tube leg 25, 45, 65 or on the second tube leg 26, 46, 66 of the measuring tube module 20, 40, 60. Either the primary sensor component 14 comprises a coil and the secondary sensor component 24, 44, 64 comprises a permanent magnet, or the secondary sensor component 24, 44, 64 comprises a coil and the primary sensor component 14 comprises a permanent magnet. The secondary sensor component 24, 44, 64 is preferably arranged on an inner side of a tube leg 25, 26, 45, 46, 65, 66, i.e., a side facing the longitudinal axis Y. The secondary sensor component 24, 44, 64 is thus particularly well protected from damage.

As shown in FIGS. 2 to 4, each vibrating tube 22, 42, 62 of the measuring tube modules 20, 40, 60 has a different tube diameter RD1, RD2, RD3, a straight first tube leg 25, 45, 65, a straight second tube leg 26, 46, 66, a curved first tube bend 27, 47, 67 and a curved second tube bend 28, 48, 68. The vibrating tubes 22, 42, 62 preferably have a circular cross-sectional shape. Of course, the vibrating tubes may have any other cross-sectional shape as long as it is compatible with the technical teachings of this invention. The vibrating tubes 22, 42, 62 are preferably made of corrosion-resistant metal, e.g., stainless steel, or of plastic. The tube diameters RD1, RD2, RD3 of the vibrating tubes 22, 42, 62 of the measuring tube modules 20, 40, 60 are preferably between 3 and 15 mm. The tube diameter is measured at the outer surface of the vibrating tube.

Figure 5:
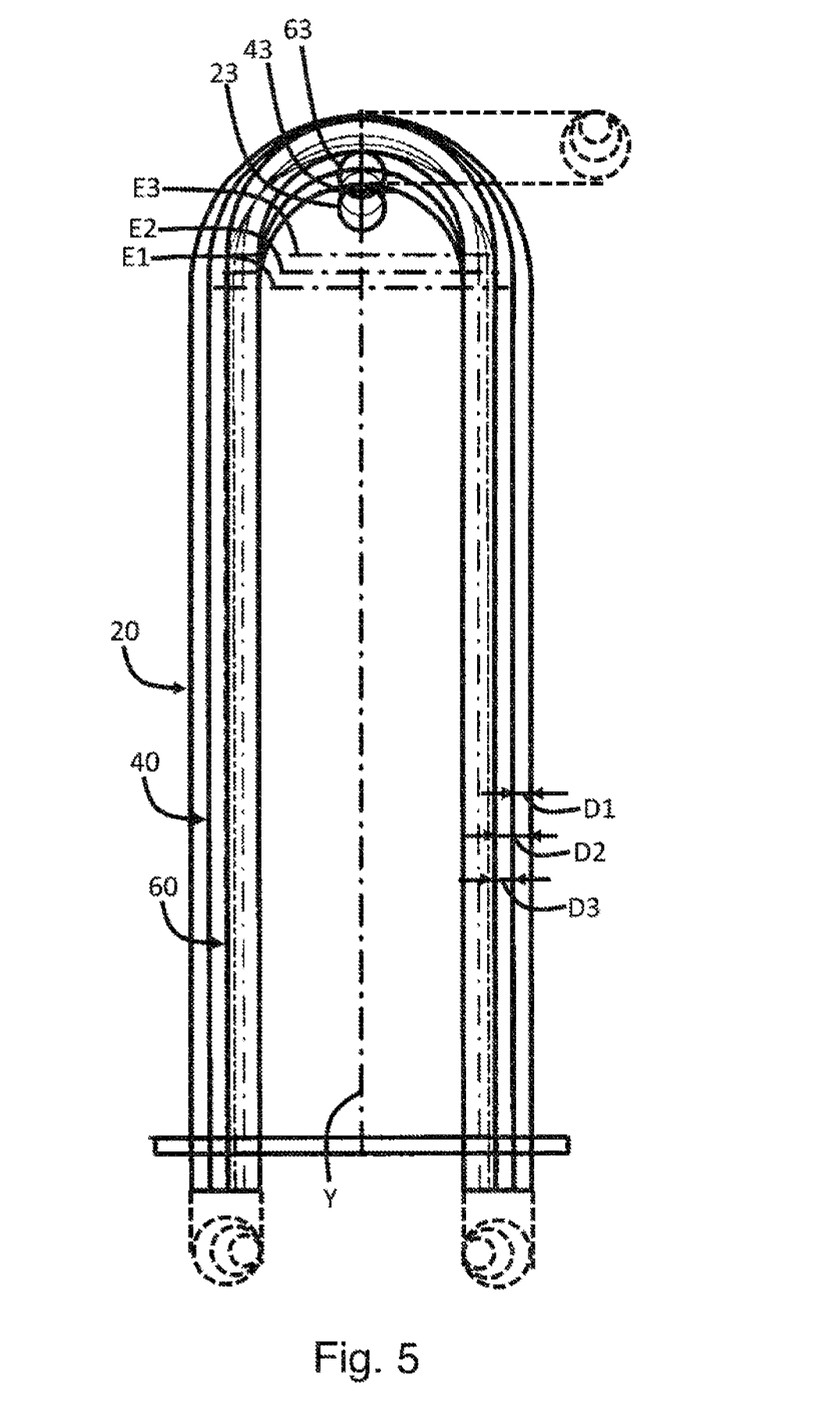
FIG. 5 shows a side view of three measuring tube modules arranged one above the other with schematic projections of the tube cross-sections.

FIG. 5 shows a superimposed side view of the measuring tube modules 20, 40, 60. In this illustration, a difference D1 between the tube diameter RD1 of the vibrating tube 22 of the first measuring tube module 20 and the tube diameter RD2 of the vibrating tube 42 of the second measuring tube module 40 is clearly visible. Also shown is a difference D2 between the tube diameter RD1 of the vibrating tube 22 of the first measuring tube module 20 and the tube diameter RD3 of the vibrating tube 62 of the third measuring tube module 60, along with a difference D3 between the tube diameter RD2 of the vibrating tube 42 of the second measuring tube module 40 and the tube diameter RD3 of the vibrating tube 62 of the third measuring tube module 60.

FIG. 5 also shows, for the sake of better understanding, a projection of a cross-section of the vibrating tubes 22, 42, 62 at various locations (shown as dashed lines). These superimposed views are obtained when the measuring tube modules 20, 40, 60 are each arranged in the support module 10. Precise positioning of the measuring tube modules 20, 40, 60 in the support module 10 is reproducible due to the receptacle 11 of the support module 10 and the restraint 21, 41, 61 of the measuring tube modules 20, 40, 60. FIG. 5 also shows a plane E1 assigned to the first measuring tube module 20, a plane E2 assigned to the second measuring tube module 40 along with a plane E3 assigned to the third measuring tube module 60. The planes E1, E2, E3 define a connection point, or rather a connection plane between the straight tube legs 25, 26, 45, 46, 65, 66 and the curved tube bends 27, 28, 47, 48, 67, 68. The connection points will be discussed in detail later. In this context, the connection point is understood to be the junction between a straight tube leg and a curved tube bend. The junction thus has a circular shape in the case of a cylindrical vibrating tube.

Figure 6:
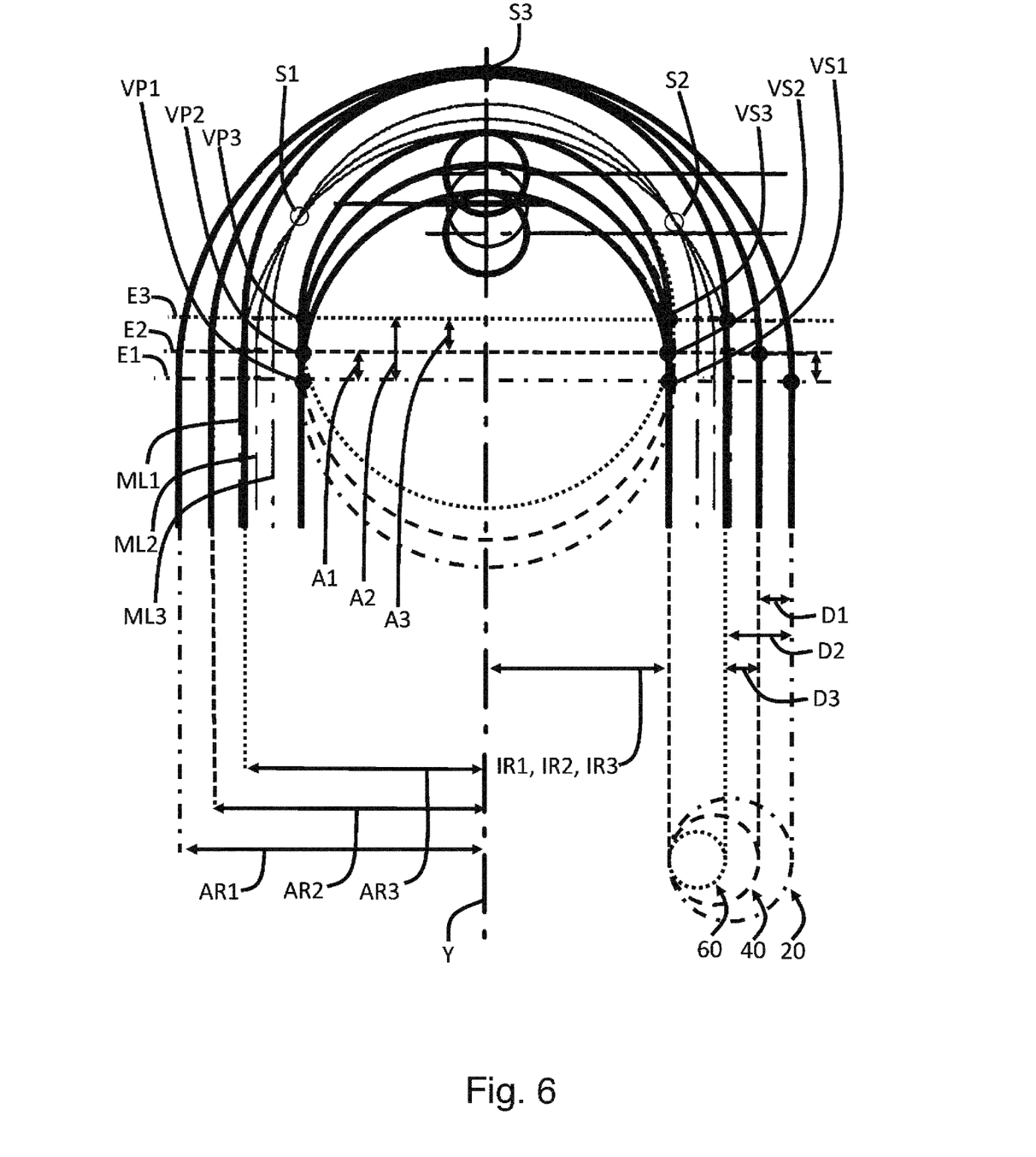
FIG. 6 shows an enlarged view of the superimposed measuring tube modules shown in FIG. 5.

In FIG. 6, for the sake of better understanding, a different line type has been used for each of the different measuring tube modules. Information relating to the first measuring tube module 20 has been shown with a dash-dotted line. Information relating to the second measuring tube module 40 has been shown with a dashed line. Information relating to the third measuring tube module 60 has been shown with a dotted line.

FIG. 6 shows that the first tube legs 25, 45, 65 are each connected to the first tube bends 27, 47, 67 at a primary connection point VP1, VP2, VP3. The first tube bends 27, 47, 67 are connected to the second tube bends 28, 48, 68. The second tube bends 28, 48, 68 are each connected to the first tube legs 25, 45, 65 at a secondary connection point VS1, VS2, VS3. In other words, each measuring tube module 20, 40, 60 can be assigned a primary connection point and a secondary connection point, as shown in FIG. 6. The primary connection point VP1, VP2, VP3 and the secondary connection point VS1, VS2, VS3 are located for each measuring tube module 20, 40, 60 in the respective plane E1, E2, E3 assigned to the measuring tube module. The planes E1, E2, E3 are arranged parallel relative to one another by a predetermined distance. The plane E1 of the first measuring tube module 20 is separated from the plane E2 of the second measuring tube module 40 by a distance A1. The plane E1 of the first measuring tube module 20 is separated from the plane E3 of the third measuring tube module 60 by a distance A2. The plane E2 of the second measuring tube module 40 is separated from the plane E3 of the third measuring tube module 60 by a distance A3.

The distance A1 corresponds to a difference D1 between the tube diameter RD1 of the vibrating tube 22 of the first measuring tube module 20 and the tube diameter RD2 of the vibrating tube 42 of the second measuring tube module 40. The distance A2 corresponds to a difference D2 between the tube diameter RD1 of the vibrating tube 22 of the first measuring tube module 20 and the tube diameter RD3 of the vibrating tube 62 of the third measuring tube module 60. The distance A3 corresponds to a difference D3 between the tube diameter RD2 of the vibrating tube 42 of the second measuring tube module 40 and the tube diameter RD3 of the vibrating tube 62 of the third measuring tube module 60.

As illustrated in FIG. 6 by the various offset circular lines, the first tube bends 27, 47, 67 and the second tube bends 28, 48, 68 preferably have an identical inner radius IR1, IR2, IR3. As an alternative to an identical inner radius, the different tube bends may also have an identical outer radius AR1, AR2, AR3 (indicated in FIG. 6 only for the first measuring tube module). Due to the spacing of the planes E1, E2, E3 along with the identical inner radii IR1, IR2, IR3 and identical outer radii AR1, AR2, AR3, respectively, the result is that the center lines ML1, ML2, ML3 associated with the vibrating tubes 22, 42, 62 intersect at a first intersection point S1 and at a second intersection point S2. The respective center line of the vibrating tube runs through the center of the vibrating tube.

The first vibrating tube thus has a center line ML1. The second vibrating tube thus has a center line ML2. The third vibrating tube thus has a center line ML3. In the straight tube legs of the vibrating tubes, the center lines thus correspond to the cylinder axes of the tube legs. By first intersection point S1 or second intersection point S2 an intersection region or intersection volume can also be understood. This means that all center lines of the different measuring tube modules intersect in an intersection region or intersection volume. The intersection region is preferably a few square millimeters, for example 1 $mm^2$ to 25 $mm^2$. The intersection volume is preferably a few cubic millimeters, for example 1 $mm^3$ to 125 $mm^3$.

The contactless temperature sensor 12 is arranged in the support module 10 such that when a measuring tube module 20, 40, 60 is received in the support module 10, the contactless temperature sensor 12 is directed at the first intersection point S1 or the second intersection point S2. It is thus achieved that an alignment axis of the temperature sensor 12 along which the measurement signal of the temperature sensor 12 runs intersects the first intersection point S1 or the second intersection point S2. This enables the measurement signal, for example an optical infrared signal from the temperature sensor 12 for each measuring tube module 20, 40, 60, to be incident on a surface of the vibrating tube 22, 42, 62 that is orthogonal to the alignment axis of the temperature sensor 12. The measurement signal is thus optimally mirrored back to the temperature sensor 12 along the alignment axis thanks to the orthogonally arranged surface of the vibrating tube 22, 42, 62, thereby enabling precise temperature measurement.

According to an embodiment of the measuring tube modules 20, 40, 60 (not shown), a tube section is arranged between the first tube bend 27, 47, 67 and the second tube bend 28, 48, 68. For example, the tube section is, for example, straight or curved. For example, such a tube section enables sufficient space to be provided for the secondary exciter body 23, 43, 63.

As shown in FIG. 5, the first tube leg 25, 45, 65 and the second tube leg 26, 46, 66 extend preferably parallel to one another. Of course, it is also possible for the first tube leg 25, 45, 65 and the second tube leg 26, 46, 66 to be arranged non-parallel to one another, provided that the two tube legs are arranged symmetrically with respect to a longitudinal axis Y of the measuring tube module 20, 40, 60.

According to the embodiment shown in FIG. 1, each measuring tube module 20, 40, 60 has at least two identical vibrating tubes 22, 42, 62. As far as technically feasible, each measuring tube module 20, 40, 60 can also have more than two identical vibrating tubes.

As illustrated in FIG. 5, the measuring tube modules 20, 40, 60 in each case extend along the longitudinal axis Y, with respect to which the respective vibrating tubes 22, 42, 62 are symmetrical. All measuring tube modules 20, 40, 60 preferably have the same extension length along the longitudinal axis Y.

FIG. 6 shows that the measuring tube modules 20, 40, 60 extend along a longitudinal axis Y, about which the vibrating tube 22, 42, 62 are symmetrical. Preferably, all vibrating tubes 22, 42, 62 intersect at a third intersection point S3, which is on the longitudinal axis Y when the vibrating tubes 22, 42, 62 are each arranged in the support module 10. In other words, each vibrating tube 22, 42, 62, when arranged in the support module 10, extends to the intersection point S3. The intersection point S3 thus also forms a vertex for the vibrating tubes 22, 42, 62.

If the tube bends 27, 28, 47, 48, 67, 68 of the vibrating tubes 22, 42, 62 have an identical inner radius IR1, IR2, IR3, the intersection point S3 will be arranged on the outside of the vibrating tubes, as shown in FIG. 6.

If the inner radii IR1, IR2, IR3 of the tube bends are identical, the inner sides of all first tube legs 25, 45, 65, along with the inner sides of all second tube legs 26, 46, 66, will be flush relative to one another when the measuring tube modules 20, 40, 60 are arranged one above the other (see FIG. 5). It goes without saying that here the term "inner side" refers to the bend of the measuring tube module, i.e., facing the inner radius.

If the tube bends 27, 28, 47, 48, 67, 68 of the vibrating tubes 22, 42, 62 have an identical outer radius AR1, AR2, AR3, the intersection point S3 will be arranged on the inside of the vibrating tubes (not shown). It goes without saying that, here, the term "inside" refers to the bend of the measuring tube module, i.e., facing the inner radius.

If the outer radii AR1, AR2, AR3 of the tube bends are identical, the outer sides of all first tube legs 25, 45, 65, along with the outer sides of all second tube legs 26, 46, 66, will be flush relative to one another when the measuring tube modules 20, 40, 60 are arranged one above the other (not shown). It goes without saying that here the term "outside" refers to the bend of the measuring tube module, i.e., facing away from the inner radius.

LIST OF REFERENCE SIGNS

1 Modular measuring device
10 Support module
11 Receptacle
12 Temperature sensor
13 Primary exciter component
14 Primary sensor component
15 Control unit
20 First measuring tube module
21 Restraint of the first measuring tube module
22 Vibrating tube of the first measuring tube module
23 Secondary exciter component of the first measuring tube module
24 Secondary sensor component of the first measuring tube module
25 First tube leg of the first measuring tube module
26 Second tube leg of the first measuring tube module
27 First tube bend of the first measuring tube module
28 Second tube bend of the first measuring tube module
40 Second measuring tube module
41 Restraint of the second measuring tube module
42 Vibrating tube of the second measuring tube module
43 Secondary exciter component of the second measuring tube module
44 Secondary sensor component of the second measuring tube module
45 First tube leg of the second measuring tube module
46 Second tube leg of the second measuring tube module
47 First tube bend of the second measuring tube module
48 Second tube bend of the second measuring tube module
60 Third measuring tube module
61 Restraint of the third measuring tube module
62 Vibrating tube of the third measuring tube module
63 Secondary exciter component of the third measuring tube module
64 Secondary sensor component of the third measuring tube module
65 First tube leg of the third measuring tube module
66 Second tube leg of the third measuring tube module
67 First tube bend of the third measuring tube module
68 Second tube bend of the third measuring tube module
A1 Distance of plane E1 to plane E2
A2 Distance of plane E1 to plane E3
A3 Distance of plane E2 to plane E3
AR1 Outer radius of the first measuring tube module
AR2 Outer radius of the second measuring tube module
AR3 Outer radius of the third measuring tube module
D1 Difference in tube diameters between the first measuring tube module and the second measuring tube module
D2 Difference in tube diameters between the first measuring tube module and the third measuring tube module
D3 Difference in tube diameters between the second measuring tube module and the third measuring tube module
E1 Plane of the first measuring tube module
E2 Plane of the second measuring tube module
E3 Plane of the third measuring tube module
IR1 Inner radius of the first measuring tube module
IR2 Inner radius of the second measuring tube module
IR3 Inner radius of the third measuring tube module
ML1 Center line of the first measuring tube module
ML2 Center line of the second measuring tube module
ML3 Center line of the third measuring tube module
RD1 Tube diameter of the first measuring tube module
RD2 Tube diameter of the second measuring tube module
RD3 Tube diameter of the third measuring tube module
VP1 Primary connection point of the first measuring tube module
VP2 Primary connection point of the second measuring tube module
VP3 Primary connection point of the third measuring tube module
VS1 Secondary connection point of the first measuring tube module
VS2 Secondary connection point of the second measuring tube module
VS3 Secondary connection point of the third measuring tube module

The invention claimed is:

1. A modular measuring device for determining a density of a measurement medium,
the device comprising:
a support module;
a first measuring tube module; and
at least one further measuring tube module, wherein the support module includes:
  a receptacle for detachably fastening the first measuring tube module and at least one further measuring tube module;
  a contactless temperature sensor;
  a primary exciter component; and
  a primary sensor component,
wherein each measuring tube module includes:
  a restraint that is complementary to a restraint of the support module;
  a vibrating tube;
  a secondary exciter component that is complementary to the primary exciter component; and
  a secondary sensor component that is complementary to the primary sensor component, wherein each vibrating tube of each measuring tube module has a different tube diameter and includes a straight first tube leg, a straight second tube leg, a curved first tube bend and a curved second tube bend,
  wherein the first tube legs are each connected to a respective first tube bend at a primary connection point, the respective first tube bends are each connected to a respective second tube bend, and the respective second tube bends are each connected to a respective second tube leg at a secondary connection point,
  wherein the primary connection point and the secondary connection point of each measuring tube module lie in a respective plane,
  wherein the respective planes have a respective distance relative to one another, which corresponds to a difference between the respective tube diameters of each vibrating tube, and
  wherein each first tube bend and each second tube bend have an identical inner radius or an identical outer radius, such that center lines associated with each respective vibrating tube intersect at a first intersection point and at a second intersection point,
wherein the contactless temperature sensor is arranged such that, when the first measuring tube module and/or the at least one further measuring tube module is received in the support module, the contactless temperature sensor is directed at the respective first intersection point or the respective second intersection point.

2. The modular measuring device according to claim 1, wherein a respective tube section is arranged between each first tube bend and each second tube bend, which tube section connects the first tube bend and the second tube bend.

3. The modular measuring device according to claim 2, wherein each tube section is straight.

4. The modular measuring device according to claim 1, wherein each first tube leg and each second tube leg extend parallel to one another.

5. The modular measuring device according to claim 1, wherein the secondary exciter component of each measuring tube module is arranged on its measuring tube module on a longitudinal axis, wherein the respective vibrating tube is symmetrical with respect to the longitudinal axis.

6. The modular measuring device according to claim 1, wherein the primary exciter component comprises a coil and each secondary exciter component comprises a permanent magnet, or
  wherein each secondary exciter component comprises a coil and the primary exciter component comprises a permanent magnet.

7. The modular measuring device according to claim 1, wherein each secondary sensor component is arranged on the first tube leg or on the second tube leg of its measuring tube module.

8. The modular measuring device according to claim 1, wherein each measuring tube module includes at least two identical vibrating tubes.

9. The modular measuring device according to claim 1, wherein each measuring tube module extends along a longitudinal axis, about which its vibrating tube is symmetrical, and wherein all measuring tube modules have a same length extending along the longitudinal axis.

10. The modular measuring device according to claim 1, wherein each measuring tube module extends along a longitudinal axis, about which its vibrating tube is symmetrical, and wherein all vibrating tubes of all measuring tube modules intersect at a third intersection point on the longitudinal axis.

* * * * *